(No Model.) 5 Sheets—Sheet 1.
H. M. ASHLEY.
MACHINERY FOR MAKING GLASS BOTTLES, &c.
No. 403,717. Patented May 21 1889.
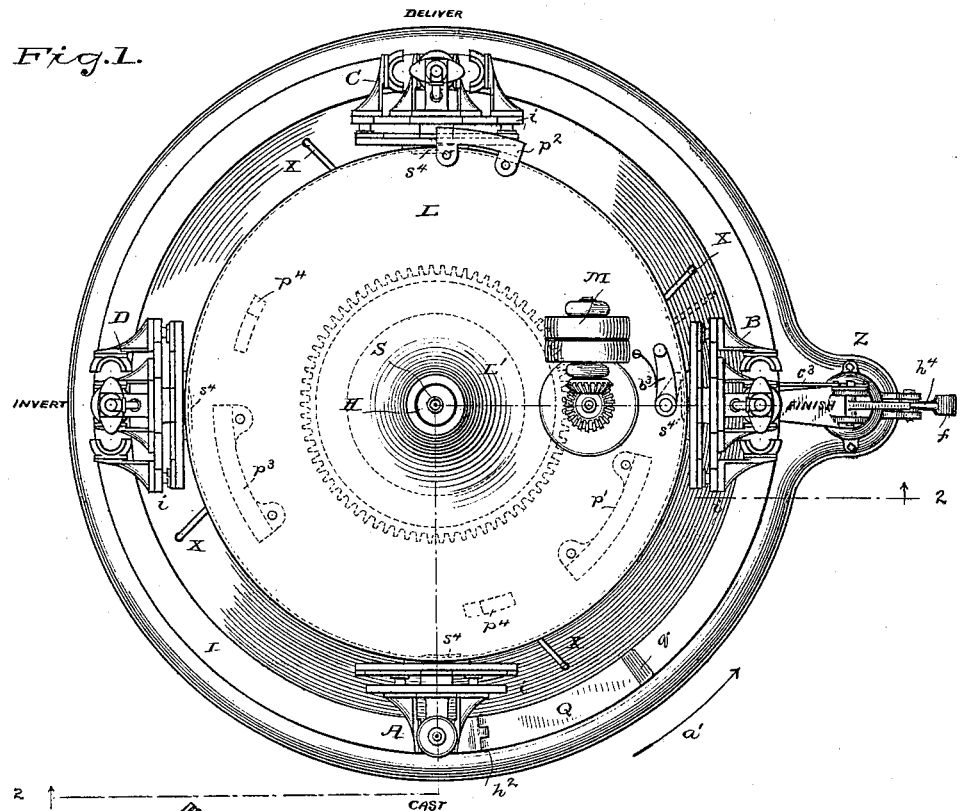
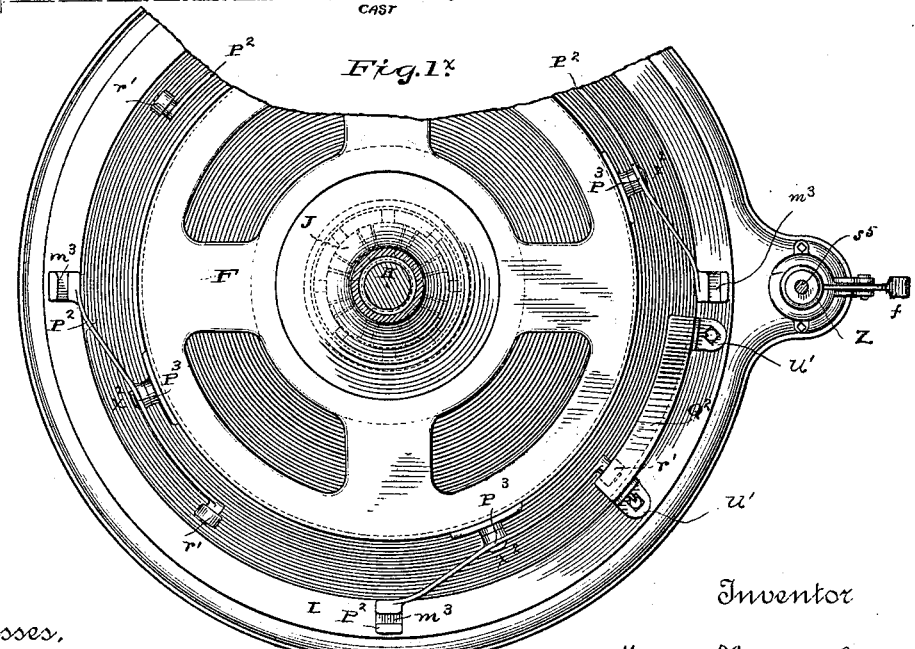
Witnesses,
Inventor
HOWARD MATRAYERS ASHLEY
By his Attorney Francis Forbes (No Model.) 5 Sheets—Sheet 2.
H. M. ASHLEY.
MACHINERY FOR MAKING GLASS BOTTLES, &c.
No. 403,717. Patented May 21 1889.
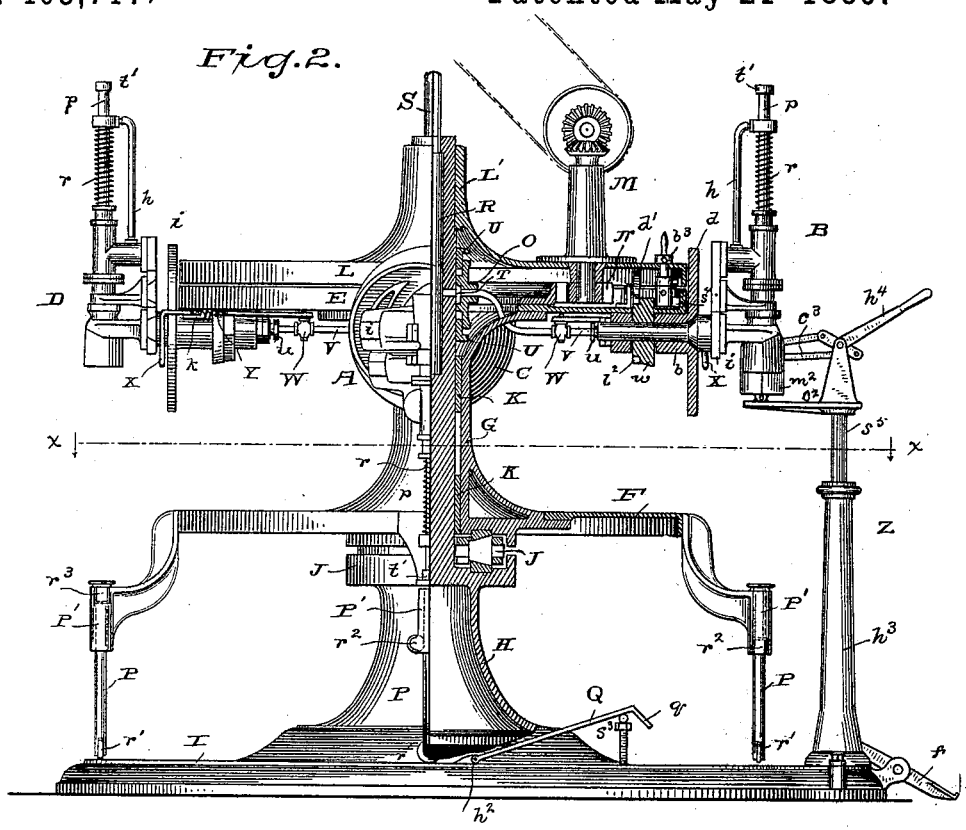
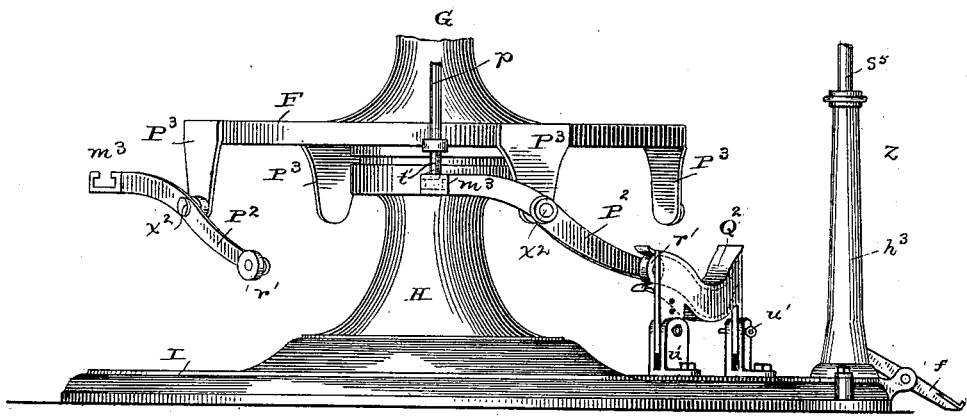
Witnesses.
Inventor,
HOWARD MATRAVERS ASHLEY
By his Attorney Francis Forbes (No Model.) 5 Sheets—Sheet 3.
H. M. ASHLEY.
MACHINERY FOR MAKING GLASS BOTTLES, &c.
No. 403,717. Patented May 21 1889.

Witnesses.

Inventor,
HOWARD MATRAVERS ASHLEY.
By his Attorney Francis Forbes (No Model.) 5 Sheets—Sheet 4.

H. M. ASHLEY.
MACHINERY FOR MAKING GLASS BOTTLES, &c.

No. 403,717. Patented May 21 1889.

Witnesses,
Lost Phillips.

Inventor,
HOWARD MATRAVERS ASHLF

By his Attorney Francis Forbes.

(No Model.) 5 Sheets—Sheet 5.
H. M. ASHLEY.
MACHINERY FOR MAKING GLASS BOTTLES, &c.
No. 403,717. Patented May 21 1889.

Witnesses,

Inventor,

HOWARD MATRAVERS ASHLEY.

By his Attorney Francis Forbes

UNITED STATES PATENT OFFICE.

HOWARD MATRAVERS ASHLEY, OF FERRYBRIDGE, COUNTY OF YORK, ENGLAND.

MACHINERY FOR MAKING GLASS BOTTLES, &c.

SPECIFICATION forming part of Letters Patent No. 403,717, dated May 21, 1889.

Application filed December 5, 1888. Serial No. 292,766. (No model.)

*To all whom it may concern:*

Be it known that I, HOWARD MATRAVERS ASHLEY, a subject of the Queen of Great Britain and Ireland, and a resident of Ferrybridge, in the county of York, England, have invented a new and useful Improvement in Machinery for Making Bottles and other Like Hollow Glassware, of which the following is a specification.

This invention is additional to a series of improvements in processes and apparatus for making bottles and like hollow glassware by machinery which I have set forth in previous specifications forming part of an application for United States Letters Patent, filed September 6, 1887, Serial No. 250,767, and divisions thereof, and in a companion case, Serial No. 290,512, filed November 10, 1888.

The present invention consists in certain novel combinations of parts hereinafter set forth and claimed, all of which are adapted to be and are preferably embodied in what I term a "repeating-machine," which performs some of its principal features automatically, and consequently with greater mechanical accuracy than a hand-machine and at a smaller outlay for labor.

Five sheets of drawings accompany this specification as part thereof.

Figure 3:
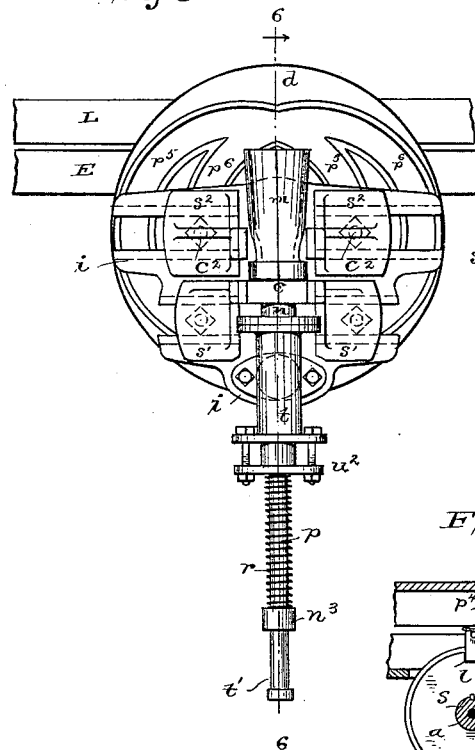
Figure 4:
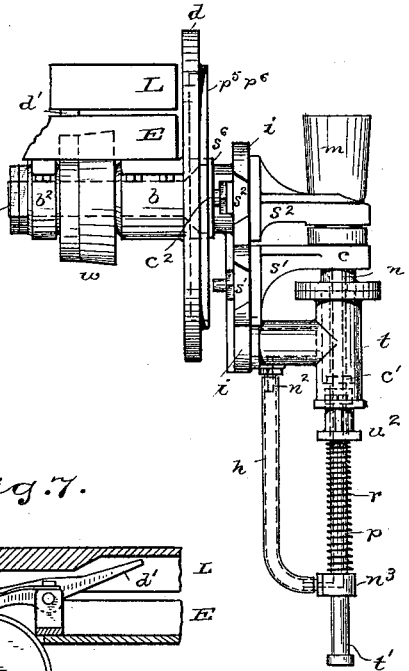
Figure 7:
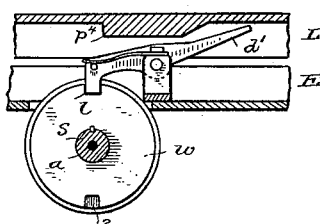
Figure 5:
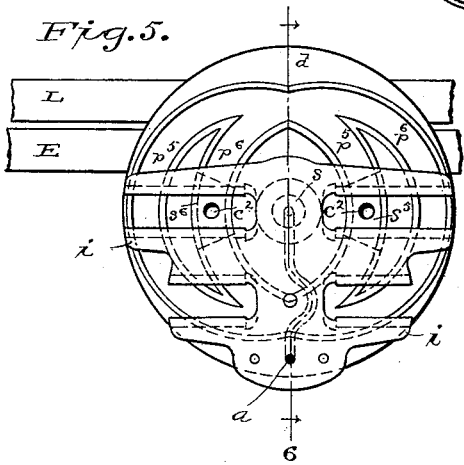
Figure 6:
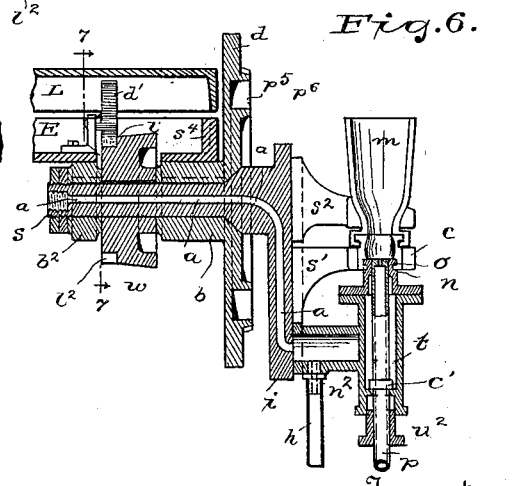
Figure 8:
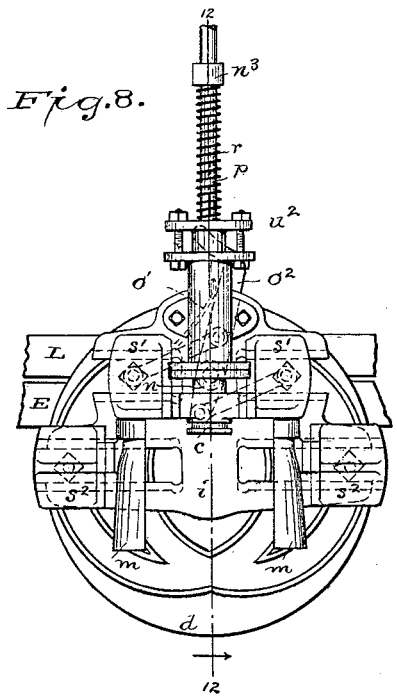
Figure 9:
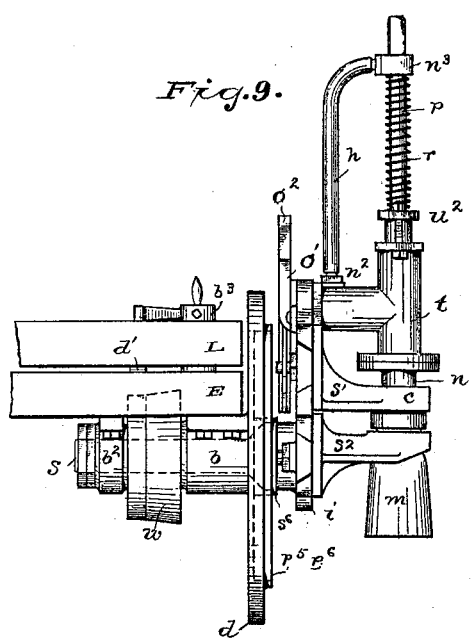
Figure 10:
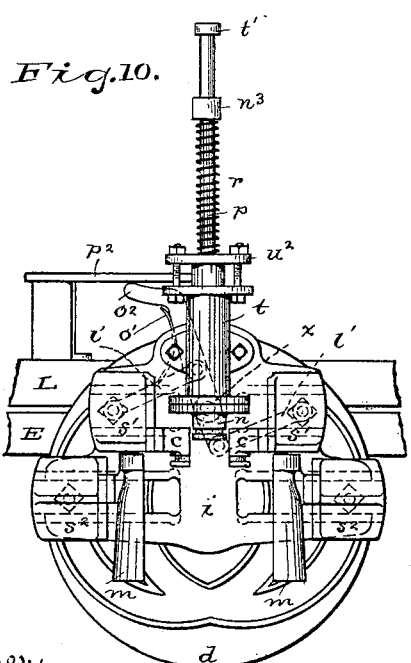
Figure 11:
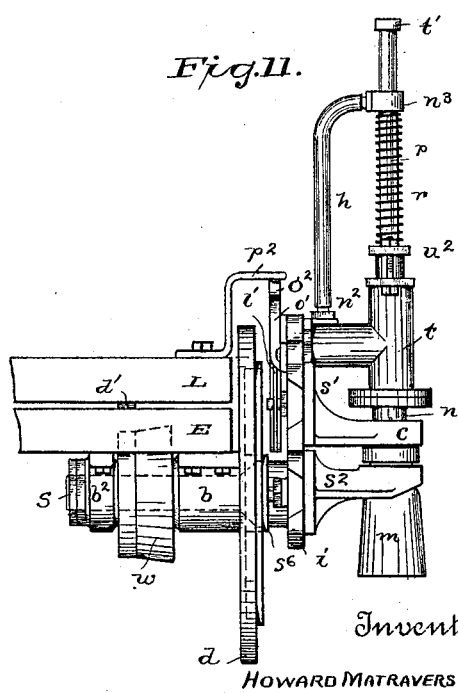
Figure 12:
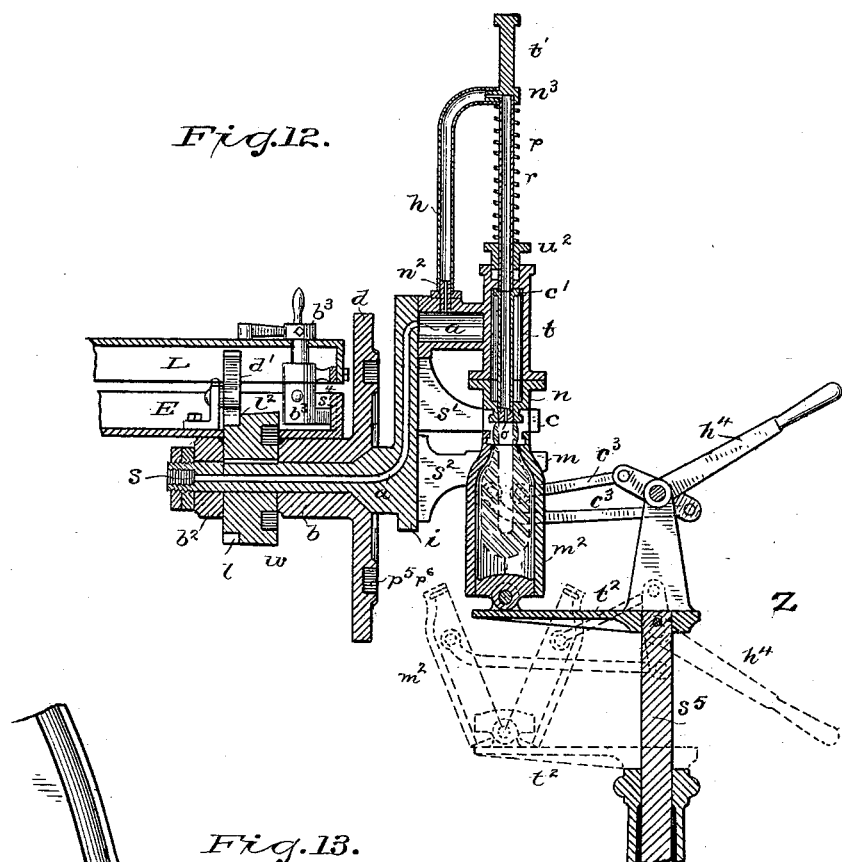
Figure 13:
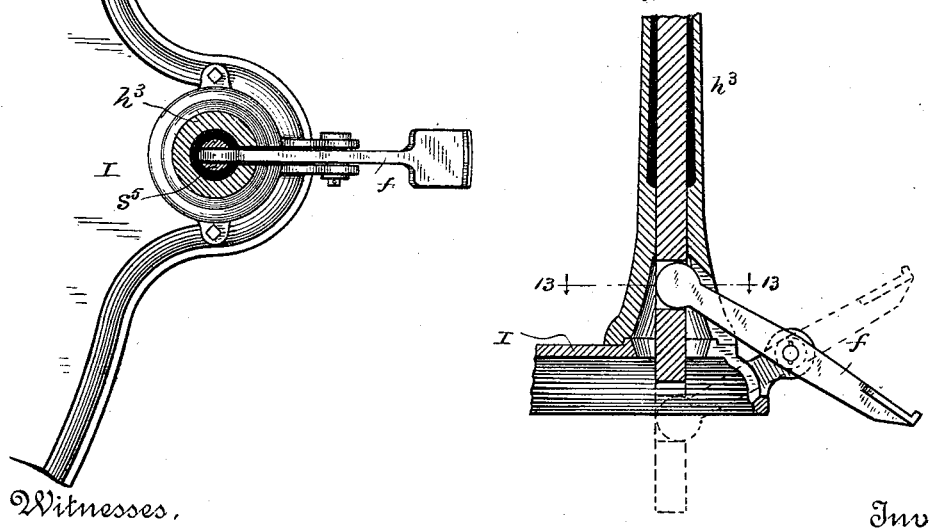

Figure 1 of the drawings represents a top view of said repeating-machine. Fig. 2 represents an elevation of the same, partly in vertical section, on the line 2 2, Fig. 1. Figs. 3 and 4 represent, respectively, detail face and side views of one of its "initial" mechanisms in "inverted" position and ready to receive the molten glass. Fig. 5 is a detail face view of certain parts of the same. Fig. 6 represents a section on the line 6 6, Figs. 3 and 4. Fig. 7 represents a section on the line 7 7, Fig. 6, at a later stage of the process. Figs. 8 and 9 represent, respectively, detail face and side views of said initial mechanism with its parison-mold open, or, in other words, ready to coact with the finishing mechanism. Figs. 10 and 11 represent like views of the same with its head-mold or collar open, or, in other words, in the act of "delivering" the finished bottle. Fig. 12 represents a sectional elevation of the finishing mechanism and a section through the coacting initial mechanism on the line 12 12, Fig. 8. Fig. 13 represents a plan of the parts below the line 13 13, Fig. 12. Figs. 1$^\times$ and 2$^\times$, Sheets 1 and 2, represent, respectively, a partial plan of the parts of an improved machine below the line $x$ $x$, Fig. 2, and an elevation of the same. Figs. 1, 2, 1$^\times$, and 2$^\times$ are drawn to one and the same scale, and the other figures are enlarged therefrom one diameter.

Like letters of reference indicate corresponding parts in the several figures.

A distinguishing feature of this repeating-machine, in either of its forms, is a series of initial mechanisms, A B C D, preferably four in number, revolving in a horizontal plane and coacting successively with a "finishing" mechanism, Z, that is stationary or fixed relatively thereto. Said initial mechanisms are conveniently carried by a horizontal disk or frame, E, which, together with a lower disk or frame, F, and a hollow hub, G, common to both, revolves around a relatively-fixed and lathe-turned vertical pillar, H, that is supported by a suitable base, I. The several initial mechanisms are arranged at equal distances apart around the circumference of said disk or frame E, and so as to project uniformly from its periphery with their axes of rotation horizontal and radial to said pillar H. An annular anti-friction bearing, J, surrounding the pillar H at the lower end of its turned portion and below the hub G, supports the revolving parts vertically, and the hub is conveniently provided with internal brasses, K, Fig. 2, to further reduce its friction. The disks or frames E F and hub G are conveniently mounted, as above, beneath a stationary disk, L, Figs. 1 and 2, the hub L' of which is fast upon the upper end of said pillar H, and they are driven by suitable mechanism, M, mounted upon said disk L. This driving mechanism comprises a pinion, N, Fig. 2, at the lower end of a vertical shaft, which pinion meshes a large spur-wheel, O, that is attached at its perimeter to the top of said disk or frame E and turns loosely upon the pillar H. In either form of the machine said initial mechanisms A B C D are all of one pattern on a given machine. One of them, belonging to the particular machine represented by Figs. 1 and 2, is shown in detail by Figs. 3 to 11, inclusive. Unless otherwise stated, reference is made to these figures exclusively in the following description. In either form of the machine each of said initial mechanisms comprises a horizontal spindle, $s$, which determines its axis of rotation, bearings $b$ $b^2$ therefor, bolted to the disk or frame E, and a non-rotary disk, $d$, which is conveniently cast in one part with said bearing $b$; also, a nozzle, $n$, a two-part head-mold or collar, $c$, a two-part parison-mold, $m$, and a vertical punch, $p$, that is axial relatively to said nozzle, collar, and parison-mold, and is guided by the former; also, an inverting-frame, $i$, lateral slides $s'$ $s^2$, carried by the latter and attached to the parts of said collar $c$ and said mold $m$, respectively, and certain devices, hereinafter set forth, whereby said slides $s^2$ are actuated by said disk $d$, and said slides $s'$ are actuated by an "opening-path," $p^2$, Figs. 1, 10, and 11, attached to said disk L at the "delivering" side of the machine; also, a frictional wheel, $w$, or the like, keyed on said spindle $s$ between said bearings $b$ $b^2$ and actuated successively by turning-paths $p'$ $p^3$, Fig. 1, on the bottom of said disk L to invert and revert said frame $i$ and the parts carried thereby; also, locking-notches $l$ $l^2$, or the like, which are conveniently formed in the periphery of said wheel $w$ to coact with a detent, $d'$, carried by said disk or frame E at each initial mechanism, and engaged by unlocking-paths $p^4$, Figs. 1 and 7, immediately preceding said turning-paths $p'$ $p^3$. The disk or frame F carries suitable motion-transmitters, P, Fig. 2, or $P^2$, Figs. $1^\times$ and $2^\times$, actuated by inclined or undulating planes or stationary actuating-cams Q, Figs. 1 and 2, or $Q^2$, Figs. $1^\times$ and $2^\times$, to actuate the punches $p$, as hereinafter more fully set forth.

In the particular machine represented by Figs. 1 and 2 and Figs. 3 to 13, inclusive, the upper part of the pillar H is provided with a bore, R, and a supply-pipe, S, for introducing a suitable gaseous fluid, as air under pressure, (hereinafter spoken of as "air,") is coupled to its upper extremity. The spur-wheel O is constructed with a suitably-chambered hub, T, Fig. 2, which embraces a perforated zone of the pillar H, and stuffing-boxes U render its respective ends air-tight. Pipes V, each provided with a spigot-valve, W, extend with suitable tight joints from the air-chamber of the hub T through stuffing-boxes $u$ at the inner ends of the spindles $s$ to an air-passage, $a$, Figs. 6 and 12, extending axially through each spindle, and thence, through the attached inverting-frame $i$, to a nipple, $n^2$, on the latter. From such nipple a short hose, $h$, extends to a suitable air-tight nozzle-coupling, $n^3$, on the corresponding punch, $p$, which in this case is hollow from its connection with the hose to its face extremity. The latter is provided with a contracted outlet-opening, $o$, Figs. 6 and 12. The punch is conveniently so made in two parts united by a coupling, $c'$, which forms a stop-collar and works within a chamber formed partly in the back of the nozzle $n$ and partly in a T-piece, $t$, which connects the nozzle with the body of the inverting-frame $i$. The retraction of the punch $p$, limited by said collar $c'$, is effected by a spiral spring, $r$, surrounding the outer portion of the punch between its coupling $n^3$ and a stuffing-box, $u^2$, at the outer extremity of the T-piece $t$. A single air-tight stuffing-box at this point suffices, owing to said hose-connection.

Other details will be set forth in describing the operation of the machine, which is as follows: In the "casting" position, in which the initial mechanism A is shown in Figs. 1 and 2, the frame $i$ of each of these mechanisms in succession is inverted and fastened by the coaction of the detent $d'$ with said locking-notch $l$, the collar $c$ and parison-mold $m$ are closed, the punch $p$ is retracted, as shown in Figs. 3 to 6, and the flow of air is cut off, excepting a slight leakage through the punch. Molten glass is then poured into the mold $m$ and flows through the collar $c$ upon the face of the nozzle $n$ to cast the head of the bottle, including the face of the lip. The disks E and F, with the hub G, are then slowly revolved in the direction of the arrow $a'$, Fig. 1. As the initial mechanism revolves, a terminal, $t'$, formed on or attached to the tail end of the punch, is so acted upon by the corresponding transmitter, P, as to thrust the punch upward into the parison, which is effected in this particular machine by an incline or cam, Q, Figs. 1 and 2, suitably arranged upon the base B, and preferably adjustable, as by a hinge, $h^2$, and a screw, $s^3$, for punching cavities of different lengths. Each transmitter P in this case slides vertically in a suitable guide, P', Fig. 2, carried by the disk F at its periphery, and anti-friction rollers $r'$ $r^2$ $r^3$ are so arranged as to keep the transmitter from binding in its guide. At the extremity of the incline or cam Q a short reversed incline, $q$, controls the retraction of the punch by its spring $r$, while said slight leakage of air through the punch keeps the parison from collapsing. The tail end of the detent $d'$ now comes in contact with the unlocking-path $p^4$, which immediately precedes the turning-path $p'$, and the unlocking operation is followed immediately by the contact of the wheel $w$ with the latter. During the "reverting" motion which then ensues the parison-mold $m$ is opened by the coaction of the non-rotary disk $d$ with the slides $s^2$. This is conveniently effected by a pair of eccentric annular paths, $p^5 p^6$, at the face of said disk, with segmental slides $s^5$ $s^6$, Figs. 4 and 5, fitted thereto, and central pin-and-socket connections, $c^2$, between said slides and the slides $s^2$. The pins of these connections are conveniently formed on the heads of screws, which unite the parts of the slides $s^2$, as represented. The slides $s^5$ $s^6$, in which the sockets are drilled, are preferably made of a suitable anti-friction bronze. When the wheel $w$ leaves the path $p'$, the reverting of the frame $i$ is completed, the detent $d'$ springs into the notch $l^2$ of the wheel, and the parison is suspended by the collar $c$ between the separated halves of the mold $m$. An opportunity is thus afforded for regulating the elongation of the parison and slightly chilling its extremity by means of a "paddle" in one hand of the operator, whose station is at the "finishing-point." (See Fig. 1.) As each initial mechanism approaches this point, the revolving motion is suitably controlled by a brake, $b^3$, having a handle within convenient reach of the operator above the disk L, in which it is pivoted, and a lever-arm within the recess of the disk E. The rim of the latter is provided internally with stops $s^4$ at the respective initial mechanisms, and said lever-arm is provided with a terminal cog or detent to coact with such stops in succession. The revolving motion is thereby temporarily arrested when the initial mechanism reaches the finishing-point, the driving-belt or a suitable clutch of the mechanism M slipping easily enough to render this practicable. The initial mechanism now stands in the position illustrated by the mechanism B, Figs. 1 and 2, where it is above the finishing mechanism Z. For the details of the latter see Figs. 12 and 13. It comprises a pillar, $h^3$, erected on the base I at said finishing-point, a vertical slide, $s^5$, guided by said pillar, a table, $t^2$, carried by the upper end of said slide, a foot-lever, $f$, for raising and lowering the table, and a shaping-mold, $m^2$, which is diametrically divided, excepting its bottom, and, together with the latter, is hinged to the top of said table $t^2$ so as to open and close at right angles to the parting-plane of the parison-mold $m$ at the same point. The neck end of the mold $m^2$ is fitted to the lower end of the collar $c$, so as to embrace the same and become coupled thereto when closed. It is elevated to the proper height by depressing the treadle end of the foot-lever $f$, and is closed by a hand-lever, $h^4$, through the medium of link-connections $c^3$ $c^3$. A hand-lever, X, Figs. 1 and 2, at the right-hand side of the initial mechanism, normally retracted by a spring, Y, Fig. 2, is now moved to its position represented by dotted lines at the finishing-point in Fig. 1, thereby turning the spigot of the corresponding valve, W, and admitting a blast of air through the punch $p$ into the parison and expanding the latter within the shaping-mold $m^2$. A suitable keeper, $k$, limits the motion of the lever X and supports its free end. When this lever is released by the operator, the mold $m^2$ is opened by means of the lever $h^4$ and then lowered by means of the foot-lever $f$, after which the brake $b^3$ is pressed back, permitting the initial mechanisms to resume their revolution. During the next stage the "finished" bottle suspended by its head from the collar $c$ is cooled by contact with the atmosphere, so as to preserve its shape.

When the initial mechanism reaches the delivering position, in which the mechanism C is shown in Figs. 1 and 2, the collar $c$ is opened and the bottle is dropped into or upon a suitable receptacle or carrier, which may convey it to the customary annealing-oven. The collar $c$ is so opened by the contact of a bent lever, $o^2$, with said delivering-path $p^2$, as illustrated by Figs. 1 and 8 to 11. The lever $o^2$ is attached to the inverting-frame $i$ by a pivot, $x$, Fig. 10, and is connected with the respective slides $s'$ $s'$ by links $l'$ $l'$ with pin-and-socket connections. When the initial mechanism starts from said delivering position, the lever $o^2$ passes out of contact with the path $p^2$, and a spring, $o'$, acting upon the same, recloses the collar. During the next half of its revolution the initial mechanism, and particularly its collar, has an opportunity to cool, while the parison-mold cools during three-fourths of its revolution, which is advantageous. While the parts are thus cooling the initial mechanism reaches the inverting position, in which the mechanism D is shown in Figs. 1 and 2, and on leaving which the second unlocking-path, $p^4$, is engaged by the detent $d'$ of the adjacent mechanism, the wheel $w$ comes into contact with the turning-path $p^3$, the inverting-frame $i$ and the parts carried thereby receive another half-turn, the parison-mold $m$ is closed, and the mechanism reaches the "casting-point" again, relocked by the detent $d'$, and ready to receive the molten glass as before.

Each of the initial mechanisms goes through the same round of movements and operations. At each quarter-turn of the disks E and F a bottle is begun, another is finished, and a third is delivered, and during each completed revolution four finished bottles are so delivered by the machine, while a single operator, together with a "feeder" for pouring in the glass, may suffice for attendance upon it.

In the preferred arrangement for actuating the punches $p$, (illustrated by Figs. $1^\times$ and $2^\times$,) knobs at the extremities of their terminals $t'$ swing into and out of open-ended mouths $m^3$ at the head ends of the lever-shaped transmitters $P^2$, and the latter are attached by central frictional or stop pivots, $x^2$, to hangers $P^3$, carried by the lower revolving disk, F, and have friction-rollers $r'$ at their tail ends. These rollers, as the initial mechanisms revolve, enter the spread-receiving end of the undulating plane or cam $Q^2$, which is preferably made double to dispense with said retracting-spring $r$, Fig. 2, &c. This "plane" or cam $Q^2$, through the successive transmitters $P^2$, thrusts the punches $p$ into the parisons in their inverted position and retracts the same, leaving each transmitter in the position in which it stood originally, so as to coact therewith at the end of another revolution thereof. The plane or cam is adjustable vertically for parisons of different lengths, as by means of suitably-divided uprights, $u'$, provided with vertical series of holes and coacting pins, for example, as shown in Fig. $2^\times$.

Details of construction and procedure which have not been specified may be of any approved description, and I do not limit my claims to bottle-machines, nor to any parts or details that are not essential to the respective combinations.

A telescopic tubular connection may be used as an equivalent of each hose $h$, and other like modifications will suggest themselves to those skilled in the art.

Having thus described said repeating-machine as a whole and modifications thereof, I claim as my invention and desire to patent under this specification—

1. The combination, in a machine for making hollow glassware, of a series of initial mechanisms revolving in a horizontal plane, and each comprising a parison-mold, a head-mold or collar, and a punch, and a relatively stationary finishing mechanism comprising a shaping-mold and means for applying the same to the parisons in succession, substantially as hereinbefore specified.

2. The combination, in a repeating-machine for making hollow glassware, of a horizontal rotary disk or frame, a series of initial mechanisms carried by said frame, and each comprising a parison-mold, a head-mold or collar, and a punch, and relatively stationary actuating parts coacting with said mechanisms in succession, substantially as hereinbefore specified.

3. The combination, in a machine for making hollow glassware, of a vertical pillar and a top disk supported by said pillar, which are stationary, a horizontal rotary disk or frame which rotates upon said pillar beneath said top disk and is provided at its periphery with a series of initial mechanisms, each comprising a parison-mold, a head-mold or collar, and a punch, and actuating parts carried by said top disk and coacting with the said mechanisms in succession, substantially as hereinbefore specified.

4. In a machine for making hollow glassware, the combination, substantially as hereinbefore specified, of a horizontal disk or frame carrying at its periphery a series of initial mechanisms and having a frictional surface and stops at the respective mechanisms, and a relatively stationary brake provided with a detent and coacting with said frictional surface and stops, for the purpose set forth.

5. In a machine for making hollow glassware, the combination, with an inverting-frame carrying a parison-mold and its appurtenances, of a detent for locking the same in its stationary positions, substantially as hereinbefore specified.

6. In a machine for making hollow glassware, the combination of a parison-mold and punch revolving in a horizontal plane, and a relatively stationary actuating-cam for thrusting the punch upward into the parison-mold as it passes said cam, substantially as hereinbefore specified.

7. The combination, substantially as hereinbefore specified, of a revolving series of parison-molds and punches, a correspondingly-revolving series of motion-transmitters, and a relatively stationary actuating-cam which coacts with said transmitters to thrust the punches upward into the several parison-molds in succession as they revolve.

8. The combination, substantially as hereinbefore specified, of a revolving series of parison-molds and their appurtenances, comprising punches having terminal knobs, a correspondingly-revolving series of motion-transmitters having mouths to embrace said knobs in the effective position of the punches, and a relatively stationary undulating cam to coact with said transmitters, having receiving and delivering ends at the same level, whereby the punches are thrust upward and retracted without the aid of springs and the transmitters are left in position for the next operation after each actuation thereof.

9. The combination, with an inverting-frame carrying a parison-mold and its appurtenances, of a wheel fast on the spindle of said frame and turning paths or surfaces to engage with said wheel for reverting and inverting said frame, substantially as hereinbefore specified.

10. The combination, with a divided parison-mold and its appurtenances and an inverting-frame which carries the same, of a relatively stationary part and connections between the same and the respective mold parts, whereby the mold is closed and opened simultaneously with its inversion and reversion, substantially as hereinbefore specified.

11. In combination with an inverting-frame carrying parison casting and punching devices, comprising a two-part parison-mold with laterally-moving supports, a relatively stationary part formed with eccentric paths, and slides working therein and connected with said supports to open and close such mold, substantially as hereinbefore specified.

12. In combination with a horizontally-revolving series of initial mechanisms comprising parison casting and punching devices, a relatively stationary finishing mechanism comprising a shaping-mold and means for closing and opening said mold, substantially as hereinbefore specified.

13. In combination with a horizontally-revolving series of initial mechanisms comprising parison casting and punching devices, a relatively stationary finishing mechanism comprising a shaping-mold, means for raising and lowering said mold, and means for closing and opening it in its elevated position, substantially as hereinbefore specified.

14. The combination, in a repeating-machine for making hollow glassware, of a chambered central pillar, a pipe coupled to said pillar and supplied with a gaseous fluid, as air, under pressure, a chambered hub embracing a perforated zone of said pillar, radial pipes leading therefrom to a revolving series of initial mechanisms, which comprise inverting-frames having hollow punches which form the cavities in the parisons, and suitable conduits connecting the radial pipes and the punches, substantially as hereinbefore specified.

15. The combination, with a horizontally-revolving series of initial mechanisms comprising parison casting and punching devices, of a conduit supplied with a gaseous fluid under pressure and communicating with each of said mechanisms, and valve mechanism for separately controlling the flow of fluid through said conduit to each of said initial mechanisms successively.

16. The combination, in a repeating-machine for making hollow glassware, of a chambered central pillar, a pipe coupled to said pillar and supplied with a gaseous fluid, as air, under pressure, a chambered hub embracing a perforated zone of said pillar, radial pipes leading therefrom to a revolving series of initial mechanisms, which comprise hollow punches and suitable hollow connections, independent valves in the respective radial pipes for regulating the flow of the gaseous fluid, and suitable means, as a hand-lever and a retracting-spring, for actuating each valve, substantially as hereinbefore specified.

17. The combination, in a mechanism for casting and punching parisons, of a hollow punch, a tubular connection between the outer portion of the punch and an air-passage within the frame, and a stuffing-box at the outer end of the guideway through which the punch slides, substantially as hereinbefore specified.

18. The combination, with an inverting-frame, of parison casting and punching devices carried thereby, comprising a two-part head-mold or collar with laterally-moving supports, a lever fulcrumed to said frame, and connections between said lever and said supports, respectively, for opening and closing said collar, substantially as hereinbefore specified.

19. The combination, with an inverting-frame, of parison casting and punching devices which comprise a two-part head-mold or collar with laterally-moving supports, a lever connected by links with said supports, respectively, and a relatively stationary path which engages with said lever to open the collar, substantially as hereinbefore specified.

HOWARD MATRAVERS ASHLEY.

Witnesses:
FRANCIS FORBES,
FREDERICK W. PEABODY.